J. A. H. HATT.
PHOTOMECHANICAL SCREEN.
APPLICATION FILED AUG. 25, 1914.
1,235,894.
Patented Aug. 7, 1917.
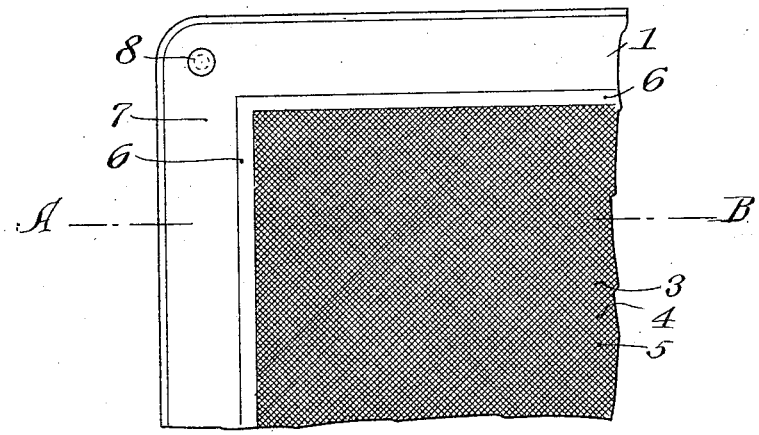
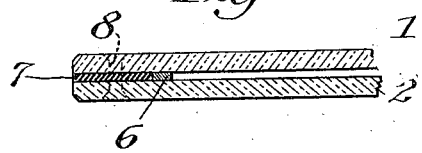
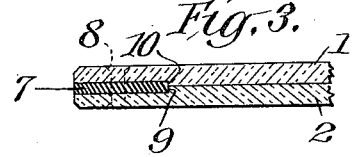
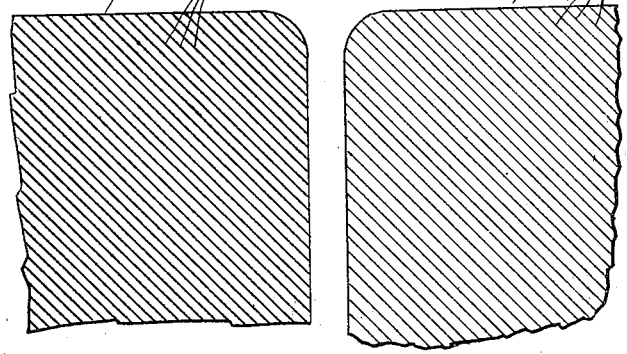
WITNESSES
INVENTOR
Joseph A. H. Hatt
BY
John D. Morgan
ATTORNEY

UNITED STATES PATENT OFFICE.

JOSEPH ARTHUR HENRY HATT, OF BROOKLYN, NEW YORK.

PHOTOMECHANICAL SCREEN.

1,235,894.  Specification of Letters Patent.  Patented Aug. 7, 1917.

Application filed August 25, 1914. Serial No. 858,566.

*To all whom it may concern:*

Be it known that I, JOSEPH ARTHUR HENRY HATT, a citizen of the United States, and a resident of the borough of Brooklyn, in the county of Kings and State of New York, have invented certain new and useful Improvements in Photomechanical Screens, of which the following is a specification.

The invention relates to screens or gratings for use in the photomechanical production of printing plates, and more especially to a screen in which the plates or parts composing the screen are not united with Canada balsam of fir—or other agent of substantially the same diffractive power as the glass, but in which the two plates are either in contact with each other or slightly spaced apart but arranged so as to maintain a vacuum between the two plates, or a gas tight union along their edges.

Objects of the invention are to provide such a screen as will meet all the requirements of commercial or shop use and retain its effectiveness unimpaired. To provide for the exclusion from the interior of such a screen all moisture, dust, or other matter or things, which would impair the usefulness or effectiveness of the screen; to provide such a screen wherein a vacuum may be maintained within the screen, or a gaseous medium may be inclosed therewithin; to provide a screen in which the inner surfaces are not cemented together, but having the inner surfaces or a light diffusing material upon the inner surfaces, acting to very slightly scatter or diffuse the light passing therethrough.

An object of my invention is to produce a superior screen for photomechanical uses; a screen in which the pencil of light when passing through the screen openings is slightly diffused—or the light is scattered slightly, or the pencil of light is enabled to ricochet to and fro between the inner and outer surfaces of the screen thereby producing a superior effect in photomechanical plates or engravings.

Other objects of the invention are to provide adequate means for the prevention of corrosion of the binding or sealing material, by using acid proof substance for such binding or sealing material. This will correct the common nuisance which screens are subject to, when used in connection with wet plate photography. In such cases the silver solution gradually eats its way into the old style screens thereby either destroying or injuring the screen.

Other objects of the invention will in part be set forth hereinafter and will in part be obvious herefrom.

The invention consists in the novel parts, articles, improvements and combination herein shown and described.

The accompanying drawings referred to herein and forming a part hereof, illustrate one embodiment of the invention, the same serving in connection with the description herein to explain the principles of the invention.

Of the drawings:

Figure 1 is a fragmentary plan view of a screen constructed in accordance with the principles of my invention;

Figs. 2 and 3 are fragmentary sections on the line A—B of Fig. 1, showing different forms of the device; and Fig. 4 is an enlarged fragmentary view corresponding to a portion of Fig. 1, but with the plates of the screen opened apart and showing the inner surface of both, the view being diagrammatic in character.

Referring to the accompanying drawings illustrating by way of example an embodiment of my invention, a screen is shown consisting of two plates, indicated respectively by reference numerals 1 and 2. Said plates are of transparent or light transmitting material such as glass which will permit free passage of the light through the clear portions of the screen.

On at least one of the plates 1 and 2, and preferably both of the plates, in accordance with certain features of the invention, are provided what may conveniently be termed screen markings, that is markings or instrumentalities which produce on the surface of the printed plate made through or by means of the screen the screen figures, that is, the breaking up of the tones or outlines of the picture or design into small parts, such as are familiar in half tone work.

In accordance with certain features of the invention, it comprises a screen composed of two parallel plates of glass or other light transmitting material, one or both of which carries a grain figure or mesh of lines or crosslines, arranged so that the two inner surfaces of the plates in connection with the two outer surfaces will permit a pencil of light to ricochet to and fro between said surfaces, thus causing a spreading action of the said pencil or ray of light.

In the embodied form of screen, markings, rulings or tintings 3 and 4 are provided. In accordance with one feature of the invention such rulings or tintings are translucent, that is, they are not opaque but have light transmitting power or property, but in a lesser degree than the clear or transparent portions of the screen.

The invention provides also in such a screen for screen markings possessing varying degrees of translucency or light transmitting power and in the present embodiment this is effected by the overlapping of the tintings or rulings 3 on one of the plates and the rulings 4 on the other of said plates, as at the points or parts 5. That is, one set of rulings or tintings, such as 3, are on one of the plates, such as plate 1, and the other set of tintings or rulings 4 are on the other plate, that is, plate 2, although this is immaterial so far as concerns certain features or aspects of the invention. The general location of the tintings and rulings arranged as last explained is indicated generally by the opened out plates in Fig. 4.

The plates 1 and 2 are slightly separated from each other and are parallel to each other, or substantially so, and are provided with means for so separating them one from the other and keeping them so separate and in substantial parallelism.

Means are also provided in accordance with one feature of the invention for sealing the two plates together around their edges so that the interior thereof, that is, the space between the two plates is permanently preserved from contamination by moisture, dust or other deleterious materials or agencies. Furthermore, the interior so sealed may be filled with the atmosphere or some other gaseous medium, or it may be maintained as a vacuum if desired. When the plates are in contact, the chief office of the seal is to exclude chemicals, moisture and dirt.

The spacing medium, when the plates are spaced apart, preferably extends all around the screen at or near the edges thereof and is preferably a strip 6 of paper, fabric or any other suitable material. It thus acts equally and uniformly at all points to determine and preserve the relative position of the plates 1 and 2. It further serves as a dam or inward boundary for the sealing material and also preserves a clear, uniform and symmetrical "sight" or operative space in the screen.

The sealing material 7 is moisture proof and preferably acid proof and is arranged all around the screen at and just within the edges and preferably occupying all the space between the edges of the plates 1 and 2 and the spacing member 6. For this purpose molten or soft gutta percha may be used.

In order to prevent the adhesive binding 7 placed around the edges of two halves of a screen, from getting loose by pressure applied inadvertently, as may sometimes happen when handling a screen quickly or roughly, I purpose reinforcing the binding by drilling a small hole in each corner of the screen and affixing thereto a rivet 8 made of a suitable metal, said rivet being made to hold the two pieces of the screen firmly together, and preferably being countersunk, although it could have rounded projecting heads if desired.

Where the two plates or two halves of a screen are to be placed together in contact (as shown in Fig. 3), I purpose making a very slight rabbet extending inward from the edges of the plates, to the distance required for the binding material, and running all around the two plates. These rabbets 9 and 10 on the two plates will be made just deep enough to allow sufficient space for the adhesive binding, and will also serve as a dam or retaining space to prevent the binding material from spreading too far inward, or for the purpose of confining the binding material within certain limits.

Where the inner surfaces of the two screens are in contact, a diffusive light action may be effected at their inner surfaces. The inner faces of the glass plates may be subjected to the fumes of hydrogen fluorid, or they may receive a slight and very delicate sand blast, or other fine and delicate abradent means may be utilized. So far as concerns certain features of the invention, when the plates are in contact, they may be attached together by a layer of Canada balsam or like material, the light diffracting action being secured by rendering the balsam very slightly milky or translucent. The diffusive light action may be effected, in accordance with certain features of the invention, by a thin layer of collodion between the plates; or when they are spaced apart, by filling the space with oil of sassafras.

It will be understood from the foregoing that a construction or embodiment is provided which realizes the objects and advantages herein set forth, and further, that changes may be made from the showing and description herein within the scope of the accompanying claims without departing from the principles of the invention.

What I do claim and desire to secure by Letters Patent is:—

1. A photo-mechanical screen including in combination two plates arranged substantially parallel to each other but slightly spaced apart, at least one of said plates being provided with screen markings, a moisture resisting adhesive binding said two plates together at their edges, and a spacing member arranged between said plates and just inwardly from said adhesive.

2. A photo-mechanical screen including in combination two plates arranged substantially parallel to each other but slightly spaced apart, one at least of said plates being provided with screen markings, means for sealing said plates around the edges to exclude moisture and to leave inclosed between said plates a space adapted to contain a gaseous medium through which the light passes in transferring the screen markings to the surface of a plate.

3. A photo-mechanical screen including in combination two plates arranged substantially parallel to each other but slightly spaced apart, one at least of said plates being provided with screen markings, means for sealing said plates around the edges to exclude moisture, and spacing means located between said plates, whereby there is inclosed between said plates a space adapted to contain a gaseous medium through which the light passes in transferring the screen markings to the surface of a plate.

4. A photo-mechanical screen including in combination two plates arranged substantially parallel to each other but slightly spaced apart, one at least of said plates being provided with screen markings, means for sealing said plates around the edges to exclude moisture, and spacing means located between said plates and inwardly from said sealing means whereby there is inclosed between said plates a space adapted to contain a gaseous medium through which the light passes in transferring the screen markings to the surface of a plate.

5. A photo-mechanical screen including in combination two plates arranged substantially parallel to each other but slightly spaced apart one at least of said plates being provided with screen markings, means for sealing said plates around the edges to exclude moisture, and a strip of material extending around within the edges of said plates and just inwardly from and abutting upon said sealing means for spacing said plates apart.

6. A photo-mechanical screen including in combination two plates arranged substantially parallel to each other but slightly spaced apart, at least one of said plates being provided with screen markings, acid resistant means for sealing said two plates together at their edges, and a spacing member arranged between said plates and just inwardly from said adhesive.

7. A photo-mechanical screen including in combination two plates arranged substantially parallel to each other but slightly spaced apart at least one of said plates being provided with screen markings, a moisture resisting adhesive binding said two plates together at their edges, and a spacing member arranged between said plates and just inwardly from said adhesive, and a mechanical fastening holding the plates together.

8. A photo-mechanical screen including in combination two plates arranged substantially parallel to each other but slightly spaced apart at least one of said plates being provided with screen markings, a moisture resisting adhesive binding said two plates together at their edges, and a spacing member arranged between said plates and just inwardly from said adhesive, and rivets holding the plates together.

9. A photo-mechanical screen including in combination two plates arranged substantially parallel to each other but slightly spaced apart, one at least of said plates being provided with screen markings, means for sealing said plates around the edges to exclude moisture and to leave inclosed between said plates a space adapted to contain a gaseous medium through which the light passes in transferring the screen markings to the surface of a plate and a mechanical fastening holding the plates together.

10. A photo-mechanical screen including in combination two plates arranged substantially parallel to each other but slightly spaced apart, one at least of said plates being provided with screen markings, means for sealing said plates around the edges to exclude moisture and to leave inclosed between said plates a space adapted to contain a gaseous medium through which the light passes in transferring the screen markings to the surface of a plate, and rivets holding the plates together.

11. A photo-mechanical screen including in combination two plates arranged substantially parallel to each other and rabbeted around their interior edges, a sealing material in the recess formed by the rabbets.

12. A photo-mechanical screen including in combination two plates arranged substantially parallel to each other and rabbeted around their interior edges, a sealing material in the recess formed by the rabbets, and mechanical means for holding the plates together.

13. A photo-mechanical screen including in combination two plates arranged substantially parallel to each other and rabbeted around their interior edges, a sealing material in the recess formed by the rabbets, and rivets holding the plates together.

14. A photo-mechanical screen including in combination two plates having half-tone rulings and being spaced apart, a diffusing fluid, in said space, and sealing means around the edges.

In testimony whereof, I have signed my name to this specification, in the presence of two subscribing witnesses.

JOSEPH ARTHUR HENRY HATT.

Witnesses:
ALAN M. JOHNSON,
LOUISA LOEHR.

Copies of this patent may be obtained for five cents each, by addressing the "Commissioner of Patents, Washington, D. C."